United States Patent
Sung et al.

(10) Patent No.: US 10,973,022 B1
(45) Date of Patent: Apr. 6, 2021

(54) MITIGATING INTER-CELL INTERFERENCE VIA GUARD PERIOD ADJUSTMENT

(71) Applicant: Sprint Spectrum LP, Overland Park, KS (US)

(72) Inventors: Sanghoon Sung, Ashburn, VA (US); Yu Wang, Fairfax, VA (US); Udit Thakore, Fairfax, VA (US); Dhaval Mehta, Aldie, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 9 days.

(21) Appl. No.: 16/200,986

(22) Filed: Nov. 27, 2018

(51) Int. Cl.
*H04W 56/00* (2009.01)
*H04W 72/04* (2009.01)
*H04B 15/00* (2006.01)
*H04B 17/345* (2015.01)

(52) U.S. Cl.
CPC ........ *H04W 72/0446* (2013.01); *H04B 15/00* (2013.01); *H04B 17/345* (2015.01)

(58) Field of Classification Search
CPC .. H04W 72/0446; H04B 17/345; H04B 15/00
USPC ......................................................... 370/329
See application file for complete search history.

(56) References Cited

U.S. PATENT DOCUMENTS

| 9,532,369 | B2 | 12/2016 | Susitaival et al. | |
| 2010/0097964 | A1* | 4/2010 | Astely | H04B 7/2656 370/280 |
| 2011/0039499 | A1* | 2/2011 | Zhang | H04W 74/0833 455/67.11 |
| 2011/0292816 | A1* | 12/2011 | Lee | H04W 74/0866 370/252 |
| 2013/0136028 | A1* | 5/2013 | Gan | H04J 3/16 370/252 |
| 2015/0249985 | A1 | 9/2015 | Han et al. | |
| 2016/0157248 | A1* | 6/2016 | Lin | H04W 72/0406 370/329 |

* cited by examiner

*Primary Examiner* — Sai Ming Chan

(57) ABSTRACT

Mitigating interference between access nodes in a wireless network includes determining interference caused to uplink signals received at a first access node by downlink signals transmitted from a second access node, and adjusting a guard period of a special subframe utilized by one or both of access nodes based on determining the interference, by switching special subframe formats to include a longer guard period. Overall interference is mitigated based on mutually-experienced propagation delay, and channel reciprocity. Adjustments are associated with known distances between access nodes.

18 Claims, 6 Drawing Sheets

MITIGATING INTER-CELL INTERFERENCE VIA GUARD PERIOD ADJUSTMENT

TECHNICAL BACKGROUND

As wireless networks evolve and grow, there are ongoing challenges in communicating data across such wireless networks. For example, a wireless network may include one or more access nodes, such as base stations, for providing wireless voice and data service to wireless devices in various coverage areas of the one or more access nodes. Wireless devices within a service area or "coverage area" of an access node may nevertheless be subject to interference from transmissions from other access nodes. For example, an uplink transmission from a first wireless device to a first access node may be subject to interference from a downlink transmission from a second access node to a second wireless device in the coverage area of the second access node. Even though the first wireless device is not in a coverage area of the second access node, the downlink transmission may cause some level of interference, which is experienced in an uplink portion of a subframe received at the first access node. This problem is compounded by the fact that time-division-duplexing (TDD) networks utilize the same frequency for uplink and downlink transmissions. Configuring access nodes to utilize the same frame configuration (i.e. sequence of uplink and downlink subframes within a frame) does not solve this problem, as the interference may be caused by a propagation delay of downlink signals from an interfering access node as experienced at a "victim" access node.

Overview

Exemplary embodiments described herein include methods, systems, and processing nodes for mitigating interference between access nodes in a wireless network, the interference being caused by downlink transmissions within a special subframe to uplink transmissions within a special subframe. An exemplary method for mitigating interference between access nodes in a wireless network include determining a first interference caused to a first uplink signal received at a first access node by a first downlink signal transmitted from a second access node. The first uplink signal can be transmitted from a wireless device in a coverage area of the first access node. The method includes determining, based on the first interference caused to the first uplink signal, that a second downlink signal transmitted from the first access node can cause a second interference to a second uplink signal received at the second access node. This determination is based on propagation delay and channel reciprocity, as further described herein. The method further includes adjusting a guard period of a special subframe utilized by one or both of the first access node and the second access node based on determining the interference. Adjusting the guard period comprises switching from a first special subframe format to a second special subframe format with a longer guard period.

An exemplary system for mitigating interference between access nodes in a wireless network include at least a processing node and a processor coupled to the processing node. The processing node may be coupled to a first access node, a second access node, a controller node, or any other network node capable of performing the inter-cell interference mitigation operations described herein. For example, a processor coupled to a processing node may be configured to perform operations including monitoring uplink signals within a special subframe received at a first access node for interference, wherein the interference is caused by downlink signals transmitted from a second access node, determining that the interference increases to a threshold, and switching special subframes utilized by the first access node from a first format to a second format. Special subframes of the second format comprise a longer guard period than special subframes of the first format.

An exemplary processing node for mitigating interference between access nodes in a wireless network is configured to perform operations including determining a first interference caused to uplink signals received at a first access node by downlink signals transmitted from one or more additional access nodes and, responsive to said determination, obtaining a distance between the first access node and a second access node from the one or more additional access nodes. A format of special subframes utilized by the first access node is selected based on the distance.

DETAILED DESCRIPTION

Figure 1:
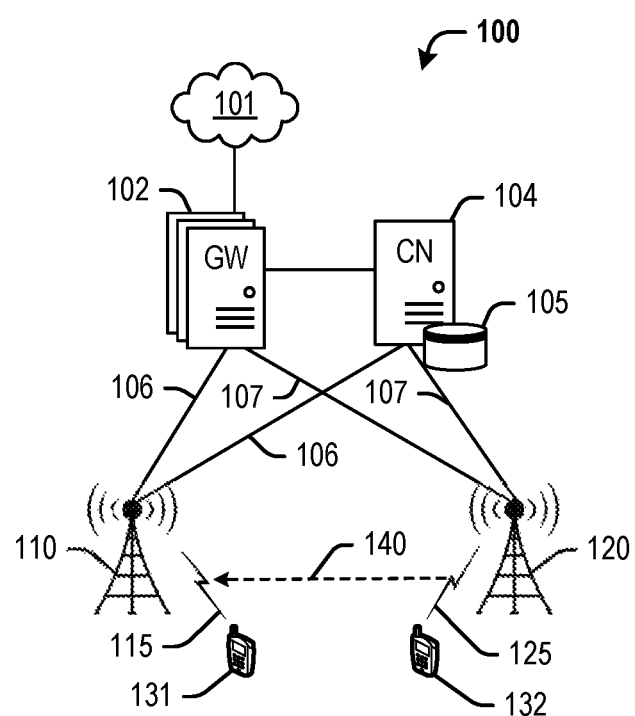
FIG. 1 depicts an exemplary system for mitigating interference between access nodes in a wireless network.

In embodiments disclosed herein, methods for mitigating interference between access nodes in a wireless network include determining a first interference caused to a first uplink signal received at a first access node by a first downlink signal transmitted from a second access node. The first uplink signal can be transmitted from a wireless device in a coverage area of the first access node. The method includes determining, based on the first interference caused to the first uplink signal, that a second downlink signal transmitted from the first access node can cause a second interference to a second uplink signal received at the second access node. This determination is based on propagation delay and channel reciprocity, as further described herein. The method further includes adjusting a guard period of a special subframe utilized by one or both of the first access node and the second access node based on determining the interference. Adjusting the guard period comprises switching from a first special subframe format to a second special subframe format with a longer guard period.

The first access node and the second access node are both configured to deploy radio air interfaces that utilize subframes in a time-division-duplexing (TDD) format and may further be configured to utilize one or more frame configurations. In TDD-LTE systems, a frame configuration comprises a prescribed sequence of downlink subframes, uplink subframes, and special subframes. Consequently, downlink and uplink subframes may utilize the same frequency, frequency band, or frequency sub-band. Special subframes are used to transition between uplink and downlink subframes. In exemplary embodiments described herein, both first and second access nodes may be configured to utilize the same frame configuration. Consequently, owing to the time-of-flight or propagation delay between the first and second access nodes, a downlink signal transmitted from the second access node may cause the first interference to the uplink signal received at the first access node, particularly when the downlink signal utilizes the same frequency as the uplink subframe (i.e., channel reciprocity). Thus, determining the interference further comprises monitoring an uplink portion of resources within the first special subframe for interference, as these are the uplink resources that are likely to be subject to interference from downlink signals transmitted by distant access nodes. Further, based on this determination, it can be determined that downlink signals from the first access node can also interfere with (i.e. cause the second interference to) uplink signals received at the second access node, as the time of flight or propagation delay is similarly experienced at the second access node.

Thus, the method further includes adjusting a guard period of the special subframe to compensate for the propagation delays of either the first or second access nodes. For example, the first access node may be instructed to change a format of a special subframe utilized therein from among a plurality of formats, and each format comprises a different guard period. As described above and herein, interference in the uplink portion of a special subframe received at the first access node indicates that downlink signals transmitted by the first access node may also be a source of interference for uplink portions of special subframes received at other access nodes. Therefore, instructing the first access node to select a special subframe format with an increased guard period can alleviate the interference caused to the other access nodes, since it is less likely that downlink signals from the first access node will coincide with uplink signals received at the second access node. Similarly, the second (or any other) access node can be instructed to select or utilize a special subframe format with an increased guard period, to mitigate the interference caused to the first access node. Therefore, a system-wide change may be implemented based on individual access nodes' interference determinations.

Further, the propagation delay and, potentially the interference level, may be associated with a distance between the first access node and the second access node. Thus, the method may further include storing associations of a plurality of distances between the first access node and a plurality of additional access nodes with a corresponding plurality of propagation delays in a database accessible to the first and second access nodes, a controller node, and/or any other network that may be configured to execute the disclosed method. For example, an identity of the second access node may be determined based on referring to the database, i.e. by correlating an interference level or time-of-flight or propagation delay, and the selection of a special subframe format from among a plurality of special subframe formats may be performed based on some combination of the distance and/or the identity of the second access node. In exemplary embodiments described herein, a special subframe format is selected based on a distance between two access nodes that may be causing interference to each other's received uplink signals. In other words, it is possible to limit inter-cell interference by proactively adjusting the guard period (based on selecting a special subframe configuration) as a function of a known distance between access nodes.

In an exemplary embodiment, the method further includes monitoring interference levels of a plurality of uplink signals received at one or both of the first access node and the second access node and increasing the guard period utilized by either or both of first access node and second access node in increments until the interference is below a threshold. The guard period is increased by selecting special subframe configurations with progressively longer guard periods. It may further be determined that the guard period of special subframes utilized by the one of the first and second access nodes cannot be increased while the interference is at or above the threshold. As a result, a guard period may be increased for special subframes utilized by the other of the first and second access nodes. Since TDD systems ensure a certain amount of channel reciprocity (i.e. as downlink and uplink subframes from each access node utilize the same frequency), downlink transmissions from the first access node can also cause the same level of interference to uplink signals received at the second access node), increasing the guard period of either first or second access nodes can help to mitigate intercell interference. Further in exemplary embodiments, the second special subframe format comprises fewer downlink resources than the first special subframe format. In other words, a special subframe format comprising a longer guard period is likely to comprise fewer downlink resources as a result.

These operations may be performed repeatedly for specific time intervals, such as a transmission time interval, or a specified number of subframes. Further, these operations may be incorporated within a system or processing node in a wireless network. For example, in another exemplary embodiment, systems for mitigating interference between access nodes in a wireless network include at least a processing node and a processor coupled to the processing node. The processing node may be coupled to a first access node, a second access node, a controller node, or any other network node capable of performing the inter-cell interference mitigation operations described herein. For example, a processor coupled to a processing node may be configured to perform operations including monitoring uplink signals within a special subframe received at a first access node for interference, wherein the interference is caused by downlink signals transmitted from a second access node, determining that the interference increases to a threshold, and switching special subframes utilized by the first access node from a first format to a second format. Special subframes of the second format comprise a longer guard period than special subframes of the first format. The operations may further include selecting the second format from one of a plurality of special subframe formats based on a distance between the first access node and the second access node. For example, as described herein, the distance may be associated with a propagation delay of the downlink signal from the second access node to the first access node, and the interference may further be a function of said propagation delay. Thus, the operations may further comprise configuring the threshold based on a known distance between the first access node and the second access node.

In an exemplary embodiment, the system is further configured to perform operations including determining that the interference increases to a second threshold, determining that the interference is additionally caused by downlink signals from a third access node, and switching the special subframes to a third format, the third format comprising a longer guard period than the first or second formats. Similar to selection of the second format, the third format is selected based on a distance between the first access node and the third access node, thereby having a guard period sufficient to compensate for the propagation delay (and resulting interference) associated with the distance between the first access node and the third access node. The operations may further comprise determining an identity of the third access node based on interference meeting the second threshold.

In yet another exemplary embodiment, a processing node for mitigating interference between access nodes in a wireless network is configured to perform operations including determining a first interference caused to uplink signals received at a first access node by downlink signals transmitted from one or more additional access nodes and, responsive to said determination, obtaining a distance between the first access node and a second access node from the one or more additional access nodes. A format of special subframes utilized by the first access node is selected based on the distance. Further, special subframes of the selected format comprise a guard period of a duration sufficient to minimize a second interference caused by downlink signals transmitted by the first access node to uplink signals received at the one or more additional access nodes based on the propagation delay and channel reciprocity mentioned above and further described herein. Thus, the operations may further include instructing the second access node to utilize special subframes comprising a guard period with an increased duration. In additional exemplary embodiments, the operations further include determining that the interference increases to a second threshold, obtaining a second distance between the first access node and a third access node from the one or more additional access nodes, and selecting a format of special subframes utilized by the first access node based on the second distance.

These and additional embodiments are further described with reference to FIGS. 1-7 below.

FIG. 1 depicts an exemplary system 100 for mitigating interference between access nodes 110, 120. System 100 comprises a communication network 101, gateway 102, controller node 104, access node 110, access node 120, and wireless devices 131, 132. Access nodes 110, 120 can be any network node configured to provide communication between wireless devices 131, 132 and communication network 101, including standard access nodes and/or short range, low power, small access nodes. For instance, access nodes 110, 120 may include any standard access node, such as a macrocell access node, base transceiver station, a radio base station, next generation or gigabit NodeBs (gNBs) in 5G networks, or enhanced eNodeBs (eNBs) in 4G/LTE networks, or the like. In an exemplary embodiment, a macrocell access node can have a coverage area in the range of approximately five kilometers to thirty five kilometers and an output power in the tens of watts. In other embodiments, access nodes 110, 120 can be a small access node including a microcell access node, a picocell access node, a femtocell access node, or the like such as a home NodeB or a home eNodeB device. In either case, as further described herein, access nodes 110, 120 can each deploy a radio air interface that is configured with a plurality of subframes enabling wireless communication with wireless devices 131, 132 via communication links 115, 125 respectively. Moreover, although access nodes 110, 120 are illustrated in FIG. 1, any number of access nodes can be implemented within system 100.

As described in the Background section above, downlink transmissions from one of access nodes 110, 120 can cause interference to uplink transmissions received at another one of access nodes 110, 120. For example, a downlink transmission transmitted on communication link 125 between access node 120 and wireless device 132 may cause interference 140 to an uplink transmission on communication link 115 between access node 110 and wireless device 131. To mitigate this interference, a processing node within system 100 (for example, a processing node communicatively coupled to access nodes 110, 120, and/or controller node 104) may be configured to determine a presence or level of interference 140 and, based thereon, to instruct at least one of access nodes 110, 120, to change a format of a special subframe to a format comprising a longer guard period. This mitigates potential interference caused to one or both of access node 110, 120. For example, the presence of interference 140 can be used to infer or determine that a downlink signals transmitted from access node 110 (on, for example, communication link 115) can also cause interference to uplink signals received at access node 120 (on, for example, communication link 115). That is to say, a direction of interference 140 can be reversed, given the aforementioned propagation delay and channel reciprocity. Thus, adjusting a guard period of a special subframe utilized by one or both of the first access node and the second access node based on the interference can mitigate interference 140 in either direction.

Access nodes 110, 120 may both be configured to utilize one or more frame configurations in their respective radio air interfaces. Each frame configuration comprises a unique sequence of subframes of different types within a frame interval. For example, in a time division duplex (TDD) network, the system bandwidth is shared between uplink and downlink, with the sharing being performed by allotting different periods of time (e.g. transmission time intervals or TTIs) to uplink and downlink transmission. A data transmission frame (or simply "frame") is about 10 ms in duration and comprises 10 subframes, each of which is about 1 ms in duration. For example, a frame of 10 ms in duration may comprise a number of subframes of 1 ms in duration (i.e., TTIs), arranged in a sequence of uplink subframes and downlink subframes. In some embodiments, a special subframe may also be used, for instance, as a guard between an uplink subframe and a downlink subframe or for any other suitable purpose, as depicted in Table 1 below:

TABLE 1

Frame Configurations

| Frame Config. | Subframe (SF0-SF9) | | | | | | | | | |
|---|---|---|---|---|---|---|---|---|---|---|
| (FC1-FCn) | SF0 | SF1 | SF2 | SF3 | SF4 | SF5 | SF6 | SF7 | SF8 | SF9 |
| FC0 | D | S | U | U | U | D | S | U | U | U |
| FC1 | D | S | U | U | D | D | S | U | U | D |
| FC2 | D | S | U | D | D | D | S | U | D | D |
| FC3 | D | S | U | U | U | D | D | D | D | D |

TABLE 1-continued

| Frame Config. | Subframe (SF0-SF9) | | | | | | | | | |
|---|---|---|---|---|---|---|---|---|---|---|
| (FC1-FCn) | SF0 | SF1 | SF2 | SF3 | SF4 | SF5 | SF6 | SF7 | SF8 | SF9 |
| FC4 | D | S | U | U | D | D | D | D | D | D |
| FC5 | D | S | U | D | D | D | D | D | D | D |
| FC6 | D | S | U | U | U | D | S | U | U | D |
| ... | | | | | ... | | | | | |
| FCn | D | S | U | F | F | D | S/D | F | F | F |

Each frame configuration in Table 1 comprises 10 subframes SF0-SF9, and each frame configuration FC0-FCn comprises a different ratio of downlink (D), uplink (U), and special (S) subframes. Other frame configurations may comprise various other sequences of special, downlink, and uplink subframes. LTE standards have prescribed seven known frame configurations (FC0-FC6 in Table 1) that can be selected from at any time by a network node, such as an access node or controller node. In other embodiments, such as in an enhanced interference mitigation and traffic adaptation (eIMTA) system within an LTE network, a frame configuration may comprise one or more flexible subframes that can be dynamically adjusted to either be downlink, uplink, or special subframes. See, for instance, configuration FCn with flexible subframes (F) in Table 1. When using a TDD frame structure, an uplink subframe and a downlink subframe may be transmitted over the same frequency at different times. Moreover, different frame configurations comprise different ratios of uplink subframes and/or downlink subframes. For the purposes of the subject disclosure, a frame configuration is not limited to existing known frame configurations, but can be any sequence of uplink and downlink subframes that can be appreciated by those having ordinary skill in the art in light of this disclosure. Thus, in exemplary embodiments described herein, both access nodes 110, 120 may be configured to utilize the same frame configuration. Consequently, owing to the time-of-flight or propagation delay between access nodes 110, 120, a downlink signal transmitted from access node 120 may cause interference 140 to the uplink signal received at access node 110, particularly when communication link 115 utilizes the same frequency as communication link 125 due to channel reciprocity. Further, based on the determined interference, it can be further determined that downlink signals from access node 110 are likely to interfere with uplink signals received at access node 120, as the time of flight or propagation delay is similarly experienced at access node 120.

As described herein, each special subframe functions as a transition between downlink and uplink subframe, by including within the special subframe resources for a downlink pilot time slot (e.g. DwPTS), uplink pilot time slot (UpPTS), and a guard period (GP). Table 2 below shows exemplary special subframe configurations with varying guard periods, and correspondingly adjusted downlink and uplink pilot time slots.

TABLE 2

| Special Subframe Configurations | | | |
|---|---|---|---|
| Special Subframe | Number of OFDM symbols | | |
| Config. (0-9) | Dw | GP | Up |
| 0 | 3 | 10 | 1 |
| 1 | 9 | 4 | 1 |
| 2 | 10 | 3 | 1 |

TABLE 2-continued

| Special Subframe Configurations | | | |
|---|---|---|---|
| Special Subframe | Number of OFDM symbols | | |
| Config. (0-9) | Dw | GP | Up |
| 3 | 11 | 2 | 1 |
| 4 | 12 | 1 | 1 |
| 5 | 3 | 9 | 2 |
| 6 | 9 | 3 | 2 |
| 7 | 10 | 2 | 2 |
| 8 | 11 | 1 | 2 |
| 9 | 6 | 6 | 2 |

As shown in Table 2 above, special subframe configurations 0-4 include an uplink duration of 1 time slot, and a sum of downlink (Dw) and guard period (GP) time slots totaling 13 time slots. Further, each special subframe configuration 0-4 comprises guard periods and downlink portions of different durations. For example, special subframe configuration 2 comprises a guard period of 3 symbols and a downlink duration of 10 symbols, while subframe configuration 1 comprises a longer guard period of 4 symbols and a correspondingly shorter downlink duration of 9 symbols. Thus, determining interference 140 can further comprise monitoring an uplink portion of resources within the special subframe as received at access node 110 for interference, as these are the uplink resources that are likely to be subject to interference 140 from downlink signals transmitted by access node 120, particularly when both access nodes 110, 120 utilize the same frame configuration as described above. Further, a processing node within system 100 may further be configured to adjust a guard period of the special subframe to compensate for the aforementioned propagation delay. For example, access node 110 may be instructed to change a format of a special subframe utilized therein from among the plurality of formats shown in Table 2, and each format comprises a different guard period. As described above and herein, interference in the uplink portion of a special subframe received at access node 110 indicates that downlink signals transmitted by access node 110 may also be a source of interference for uplink portions of special subframes received at access node 120. Therefore, instructing access node 110 to select a special subframe format with an increased guard period can alleviate the interference caused to other access nodes (including access node 120), since it is less likely that downlink signals from access node 110 will coincide with uplink signals received at access node 120. Similarly, access node 120 can be instructed to select or utilize a special subframe format with an increased guard period, so as to mitigate the interference caused to access node 110. Therefore, a system-wide change may be implemented based on individual access nodes' interference determinations.

Further, the propagation delay and, potentially the interference level, may be associated with a distance between the access nodes 110 and 120, and associations of a plurality of distances between each access node 110, 120 and/or a plurality of additional access nodes with a corresponding plurality of propagation delays may be stored in a database, such as database 105 coupled to controller node 104. In an exemplary embodiment, an identity of an interfering access node (such as access node 120) may be determined based on referring to database 105, i.e. by correlating interference 140 with a time-of-flight or propagation delay (which is further indicative of the distance), and the selection by access node 110 of a special subframe format from among a plurality of special subframe formats may be performed based on a combination of the distance and/or the identity of access node 120. In exemplary embodiments described herein, a special subframe format is selected based on a distance between two access nodes that may be causing interference to each other's received uplink signals. In other words, it is possible to limit inter-cell interference by proactively adjusting the guard period (based on selecting a special subframe configuration) as a function of a known distance between access nodes.

Additional exemplary operations performed by system 100 can further include monitoring interference levels of a plurality of uplink signals received at one or both of access nodes 110, 120 and the second access node, and increasing the guard period utilized by either access node 110, 120 in increments until the interference is below a threshold. The guard period is increased by selecting special subframe configurations with progressively longer guard periods as selected from, e.g. the special subframe configurations in Table 2. It may further be determined that the guard period of special subframes utilized by the one of access nodes 110, 120 cannot be increased while the interference is at or above the threshold. As a result, a guard period may be increased for special subframes utilized by the other access node 110, 120. Since TDD systems ensure a certain amount of channel reciprocity (i.e. as downlink and uplink subframes from each access node utilize the same frequency), downlink transmissions from the access node 110 can also cause the same level of interference to uplink signals received at access node 120, increasing the guard period of either access nodes 110, 120 can help to mitigate intercell interference. Further in exemplary embodiments, the second special subframe format comprises fewer downlink resources than the first special subframe format. In other words, a special subframe format comprising a longer guard period is likely to comprise fewer downlink resources as a result.

In a related exemplary embodiment, a processing node coupled to one or more of access nodes 110, 120, controller node 104, or any other network node may be configured to perform operations including monitoring uplink signals within a special subframe received at one or both of access nodes 110, 120 for interference, wherein the interference is caused to one of access nodes 110, 120 by downlink signals transmitted by the other of access nodes 110, 120, determining that the interference increases to a threshold, and switching special subframes utilized by one of access nodes 110, 120 from a first format to a second format, as provided above in Table 2. Special subframes of the second format comprise a longer guard period than special subframes of the first format. The operations may further include selecting the second format from one of a plurality of special subframe formats based on a distance between access nodes 110, 120. For example, as described above, the distance may be associated with a propagation delay of a downlink signal from access node 120 to access node 110, and the interference (e.g. interference 140) may further be a function of said propagation delay. Thus, the operations may further comprise configuring the threshold based on a known distance between access nodes 110, 120.

In yet another exemplary embodiment, a processing node coupled to one or more of access nodes 110, 120, controller node 104, or any other network node may be configured to perform operations including determining a first interference caused to uplink signals received at access node 110 by downlink signals transmitted from access node 120 and, responsive to said determination, obtaining a distance between access nodes 110, 120. A format of special subframes utilized by the one or both of access nodes 110, 120 is selected based on the distance. Further, special subframes of the selected format comprise a guard period of a duration sufficient to minimize a second interference caused by downlink signals transmitted by access node 110 to uplink signals received at access node 120 based on the aforementioned propagation delay and channel reciprocity. Further, the operations may include instructing access node 120 to utilize special subframes comprising a guard period with an increased duration.

Access nodes 110, 120 can comprise a processor and associated circuitry to execute or direct the execution of computer-readable instructions to perform operations such as those further described herein. Briefly, access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 120 can receive instructions and other input at a user interface. Access nodes 110, 120 communicate with gateway node 102 and controller node 104 via communication links 106, 107. Access nodes 110, 120 may communicate with each other and with other access nodes (not shown) using a direct link such as an X2 link or similar.

Wireless devices 131, 132 may be any device, system, combination of devices, or other such communication platform capable of communicating wirelessly with access nodes 110, 120 using one or more frequency bands of a radio-air interface deployed therefrom. Wireless devices 131, 132 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110, 120. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 131, 132, etc. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), 5G NR, or combinations thereof. Communications links 106, 107 may include Si communications links. Other wireless protocols can also be used. Communication links 106, 107 can be a direct link or might include various equipment, intermediate components, systems, and networks. Communication links 106, 107 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to access nodes 110, 120 and wireless devices 131, 132, such as known distances and/or locations of access nodes 110, 120, and associations thereof with propagation delays, interference levels, and/or special subframe configurations utilized by access nodes 110, 120. This information may be requested by or shared with access nodes 110, 120 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access nodes 110, 120, controller node 104, and/or network 101.

Figure 2:
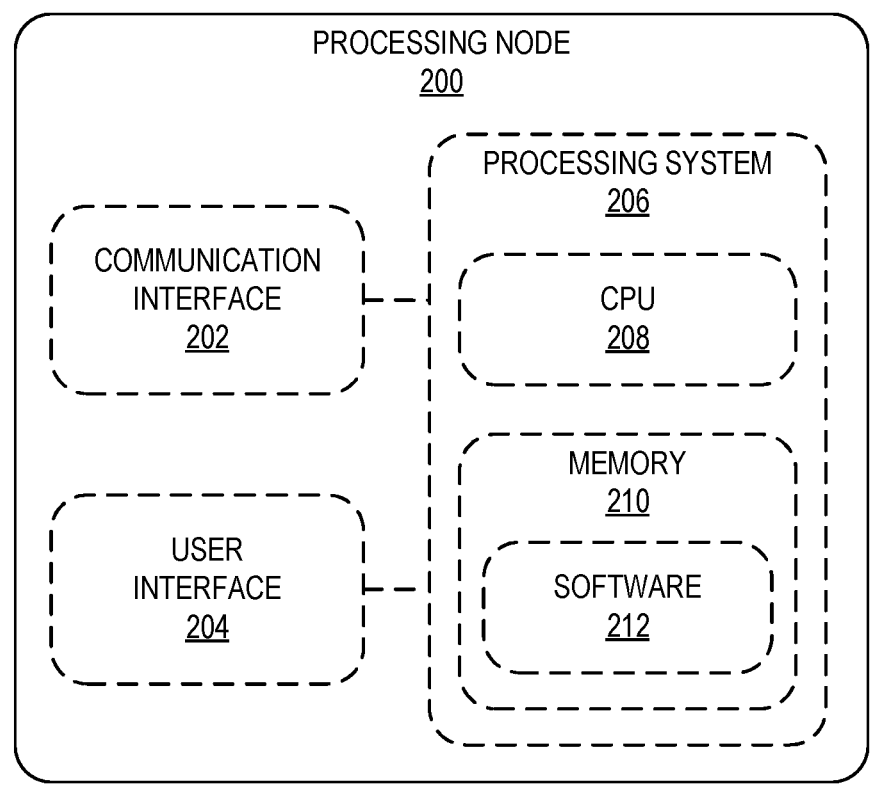
FIG. 2 depicts an exemplary processing node for mitigating interference between access nodes in a wireless network.

FIG. 2 depicts an exemplary processing node 200 for mitigating interference between access nodes in a wireless network. Processing node comprises a communication interface 202, user interface 204, and processing system 206 in communication with communication interface 202 and user interface 204. Processing system 206 includes a central processing unit (CPU) 208, and a memory 210, which can comprise a disk drive, flash drive, memory circuitry, or other memory device. Memory 210 can store software 212 which is used in the operation of the processing node 200. Software 212 may include computer programs, firmware, or some other form of machine-readable instructions, including an operating system, utilities, drivers, network interfaces, applications, or some other type of software. For example, software 212 may include an interference mitigation module comprising instructions for performing the operations described herein. Processing system 206 may include other circuitry to retrieve and execute software 212 from memory 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

Figure 3:
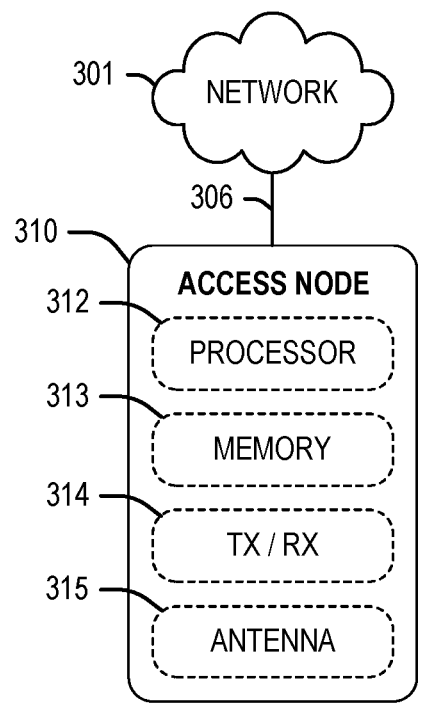
FIG. 3 depicts an exemplary access node for mitigating interference between access nodes in a wireless network.

FIG. 3 depicts an exemplary access node 310 for allocating resources in a control channel. Access node 310 is configured as an access point for providing network services from network 301 to end-user wireless devices via a radio-air interface deployed therefrom. Access node 310 is illustrated as comprising a processor 312, a scheduler 313 for storing the scheduling operations recited herein (that are performed by processor 312), and a transceiver 314 for transmitting and receiving signals via antennae 315. Although only one transceiver and antenna are depicted in access node 310, additional transceivers and antennae may be incorporated in order to deploy multiple carriers, formed beams, MU-MIMO data streams, and/or to facilitate communication with other network nodes on network 301. Further, access node 310 is communicatively coupled to network 301 via communication interface 306, which may be any wired or wireless link as described above.

Figure 4:
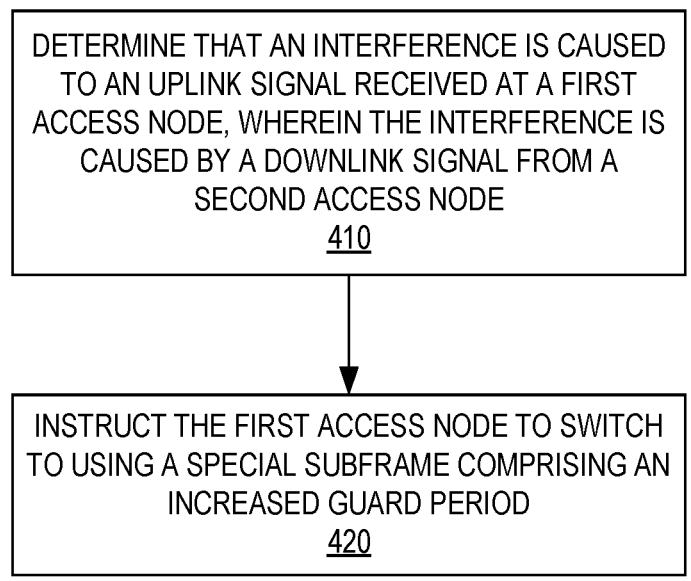
FIG. 4 depicts an exemplary method for mitigating interference between access nodes in a wireless network.

FIG. 4 depicts an exemplary method for allocating resources in a control channel. The method of FIG. 4 is illustrated with respect to an access node, a controller node, or any other network node capable of performing the operations described herein. In other embodiments, the method can be implemented with any suitable network element. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 410, it is determined that an interference is caused to an uplink signal received at a first access node by a downlink signal transmitted from a second access node. The first access node and the second access node are both configured to utilize subframes in a time-division-duplexing (TDD) format, and may further be configured to utilize one or more frame configurations. In TDD-LTE systems, a frame configuration comprises a prescribed sequence of downlink subframes, uplink subframes, and special subframes. Consequently, downlink and uplink subframes may utilize the same frequency, frequency band, or frequency sub-band. Special subframes are used to transition between uplink and downlink subframes. In exemplary embodiments described herein, both first and second access nodes may be configured to utilize the same frame configuration. Consequently, owing to the time-of-flight or propagation delay between the first and second access nodes, a downlink signal transmitted from the second access node may cause the first interference to the uplink signal received at the first access node, particularly when the downlink signal utilizes the same frequency as the uplink subframe (i.e., channel reciprocity). Thus, determining the interference further comprises monitoring an uplink portion of resources within the first special subframe for interference, as these are the uplink resources that are likely to be subject to interference from downlink signals transmitted by distant access nodes. Further, based on this determination, it can be determined that downlink signals from the first access node can also interfere with (i.e. cause the second interference to) uplink signals received at the second access node, as the time of flight or propagation delay is similarly experienced at the second access node.

Thus, at 420, the first access node is instructed to adjust a guard period of a special subframe based on the interference determined in 410. Adjusting the guard period comprises switching from a first special subframe format to a second special subframe format with a longer guard period, thereby compensating for the propagation delays of either the first or second access nodes. In other words, instructing the first access node to select a special subframe format with an increased guard period can alleviate the interference caused to the other access nodes, since it is less likely that downlink signals from the first access node will coincide with uplink signals received at the second access node. Similarly, the second (or any other) access node can be instructed to select or utilize a special subframe format with an increased guard period, so as to mitigate the interference caused to the first access node. Therefore, a system-wide change may be implemented based on individual access nodes' interference determinations.

Figure 5A:
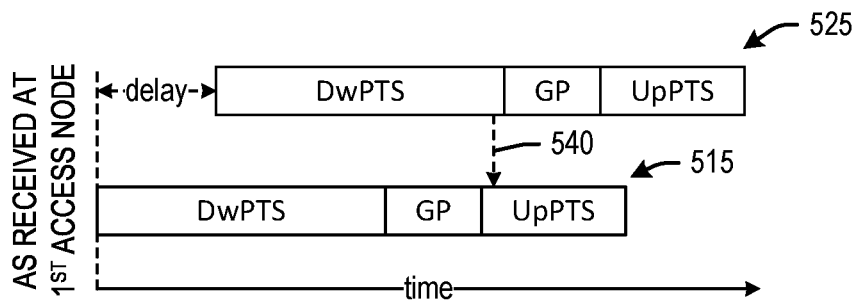
FIGS. 5A-5D depict interference caused between downlink and uplink portions of exemplary subframes utilized by access nodes in a wireless network.

FIGS. 5A-5D depict interference caused between downlink and uplink portions of exemplary subframes utilized by access nodes in a wireless network. As described herein, two access nodes in a wireless network may be configured to utilize the same frame configuration (i.e. sequence of uplink, downlink, and special subframes). Consequently, owing to the time-of-flight or propagation delay between the access nodes, a downlink signal transmitted from the second access node may cause the first interference to the uplink signal received at the first access node, particularly when the downlink signal utilizes the same frequency as the uplink subframe (i.e., channel reciprocity). This is illustrated in FIG. 5A, showing special subframe 515 (utilized by a first access node) and 525 (utilized by a second access node distant from the first access node). As experienced by the first access node, special subframe 515 does not include a propagation delay (or, at least, includes a negligible propagation delay) since it is utilized for transmissions within a coverage area of the first access node. For example, special subframe 515 includes an uplink portion (UpPTS) that may contain uplink transmissions from wireless devices attached to the first access node. On the other hand, special subframe 525 utilized for communication sessions of a second access node distant from the first access node may be experienced at the first access node with a propagation delay. For example, the propagation delay causes a downlink portion (DwPTS) of the special subframe 525 to coincide with the uplink portion of special subframe 515, thereby causing an interference 540.

Figure 5B:
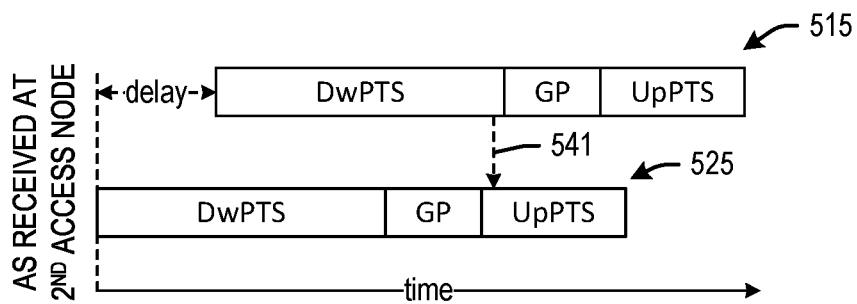

Further, based on this determination, it can be determined that downlink signals from the first access node can also interfere with uplink signals received at the second access node, as the time of flight or propagation delay is similarly experienced at the second access node. As illustrated in FIG. 5B, from the perspective of the second access node, special subframe 525 does not include a propagation delay (or, at least, includes a negligible propagation delay) since it is utilized for transmissions within a coverage area of the second access node. For example, special subframe 525 includes an uplink portion (UpPTS) that may contain uplink transmissions from wireless devices attached to the second access node. On the other hand, special subframe 515 utilized for communication sessions of the first access node distant from the second access node may be experienced at the second access node with a propagation delay. For example, the propagation delay causes a downlink portion (DwPTS) of the special subframe 515 to coincide with the uplink portion of special subframe 525, thereby causing an interference 541.

Figure 5C:
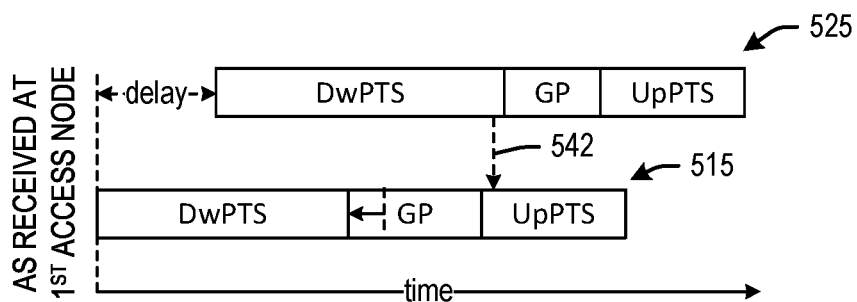
Figure 5D:
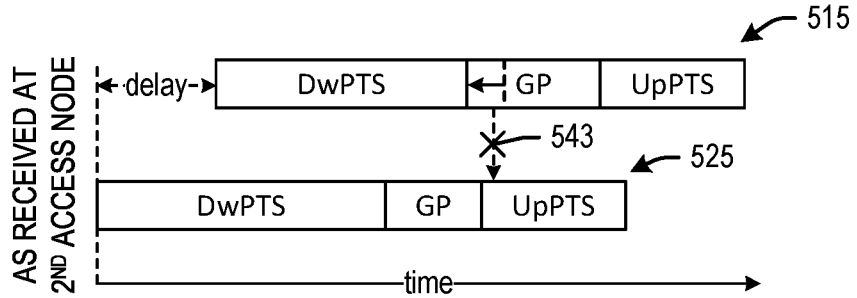

Thus, the method further includes adjusting a guard period of the special subframe of at least one of the first and second access nodes to compensate for the propagation delays of either the first or second access nodes. For example, FIGS. 5C-5D show the effect of instructing the first access node to change a format of a special subframe utilized therein from among a plurality of formats to a format with a greater guard period. As illustrated in FIG. 5C, from the perspective of the first access node, special subframe 515 (utilized by the first access node) now includes a longer guard period and, consequently, a smaller downlink period. Switching the special subframe format to a longer guard period may not make a different in interference 542 experienced at the first access node, since the downlink portion (DwPTS) of special subframe 525 continues to interfere with the uplink portion (UpPTS) of special subframe 515. However, with reference to FIG. 5D, from the perspective of the second access node, the longer guard period of special subframe 515 (utilized by the first access node) reduces the downlink portion of special subframe 515, thereby preventing any interference 543 the downlink portion of special subframe 515, mitigating the interference experienced by the uplink portion (UpPTS) of special subframe 525. Since interference in the uplink portion of a special subframe 515 received at the first access node indicates that downlink signals transmitted by the first access node may also be a source of interference for uplink portions of special subframes 525 received at the second access node, instructing the first access node to select a special subframe format 515 with an increased guard period can alleviate the interference caused to the second access node, since it is less likely that downlink signals from the first access node will coincide with uplink signals received at the second access node, as illustrated in FIG. 5D. The second (or any other) access node can be instructed to select or utilize a special subframe format with an increased guard period in a similar manner, so as to mitigate the interference caused to the first access node. Therefore, a system-wide change may be implemented based on individual access nodes' interference determinations.

Figure 6:
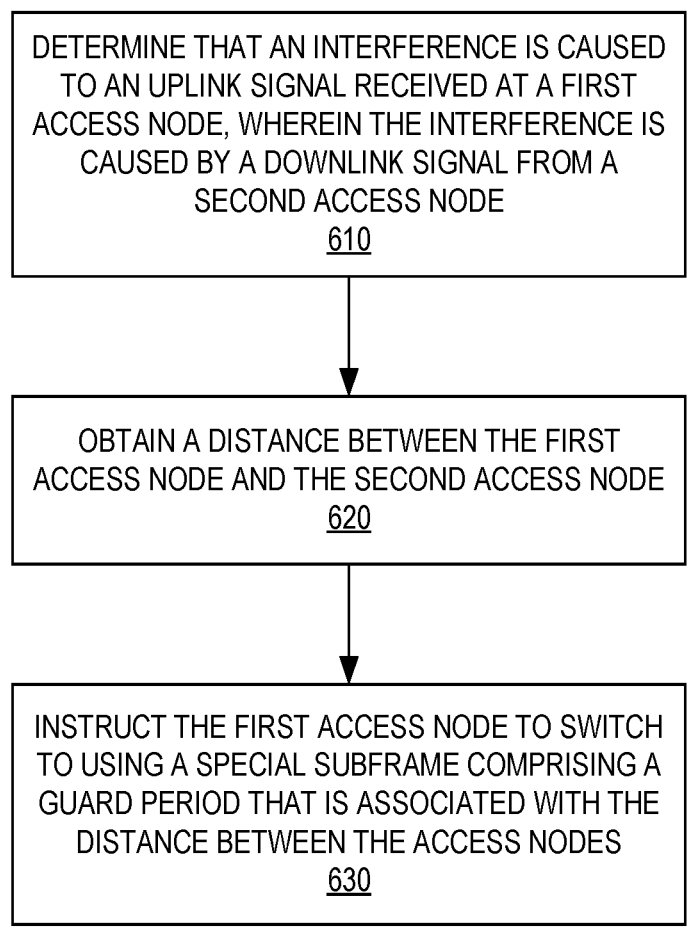
FIG. 6 depicts an exemplary method for selecting a special subframe format based on a distance between access nodes in a wireless network.

FIG. 6 depicts an exemplary method for selecting a special subframe format based on a distance between access nodes in a wireless network. The method of FIG. 6 is illustrated with respect to an access node, a controller node, or any other network node capable of performing the operations described herein. In other embodiments, the method can be implemented with any suitable network element. Although FIG. 6 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 610, it is determined that an interference is caused to an uplink signal received at a first access node by a downlink signal transmitted from a second access node. The first access node and the second access node are both configured to utilize subframes in a time-division-duplexing (TDD) format, and may further be configured to utilize one or more frame configurations. In TDD-LTE systems, a frame configuration comprises a prescribed sequence of downlink subframes, uplink subframes, and special subframes. Consequently, downlink and uplink subframes may utilize the same frequency, frequency band, or frequency sub-band. Special subframes are used to transition between uplink and downlink subframes. In exemplary embodiments described herein, both first and second access nodes may be configured to utilize the same frame configuration. Consequently, owing to the time-of-flight or propagation delay between the first and second access nodes, a downlink signal transmitted from the second access node may cause the first interference to the uplink signal received at the first access node, particularly when the downlink signal utilizes the same frequency as the uplink subframe (i.e., channel reciprocity). Thus, determining the interference further comprises monitoring an uplink portion of resources within the first special subframe for interference, as these are the uplink resources that are likely to be subject to interference from downlink signals transmitted by distant access nodes. Further, based on this determination, it can be determined that downlink signals from the first access node can also interfere with (i.e. cause the second interference to) uplink signals received at the second access node, as the time of flight or propagation delay is similarly experienced at the second access node.

At 620, a distance is obtained between the first and second access nodes. For example, as described above and (with reference further to FIGS. 7A-7D), the propagation delay and, potentially the interference level, may be associated with a distance between access nodes. Thus, the method may further include storing associations of a plurality of distances between the first access node and a plurality of additional access nodes with a corresponding plurality of propagation delays in a database accessible to the first and second access nodes, a controller node, and/or any other network that may be configured to execute the disclosed method. The distance may be obtained by, for example, referring to the database, or determining an identity of the second access node (or any other access node that is a source of interference), and correlating the identity of the interfering access node with a known geographical location of the access node.

Then, at 630, the first access node is instructed to adjust a guard period of a special subframe based on the distance determined in 620. For example, the selection of a special subframe format from among a plurality of special subframe formats may be performed based on some combination of the distance and/or the identity of the second access node. Further, adjusting the guard period comprises switching from a first special subframe format to a second special subframe format with a longer guard period, thereby compensating for the propagation delays of either the first or second access nodes. Thus, it is possible to limit inter-cell interference by proactively adjusting the guard period (based on selecting a special subframe configuration) as a function of a known distance between access nodes. In other words, instructing the first access node to select a special subframe format with an increased guard period can alleviate the interference caused to the other access nodes, since it is less likely that downlink signals from the first access node will coincide with uplink signals received at the second access node. Similarly, the second (or any other) access node can be instructed to select or utilize a special subframe format with an increased guard period, so as to mitigate the interference caused to the first access node. Therefore, a system-wide change may be implemented based on individual access nodes' interference determinations.

FIGS. 7A-7D depict exemplary associations of distances between access nodes with propagation delays and guard periods. For example, with reference to FIG. 7A, access node 710 is a distance D1 away from access node 720, and a distance D2 away from access node 730. These distances may be based on known geographical locations of each access node 710-730, and may be obtained or determined based on an identifier or identity of each access node 710-730. Consequently, owing to the time-of-flight or propagation delay between access nodes 710-730, a downlink signal transmitted from each access node may cause an interference to uplink signals received at another access node.

Figure 7A:
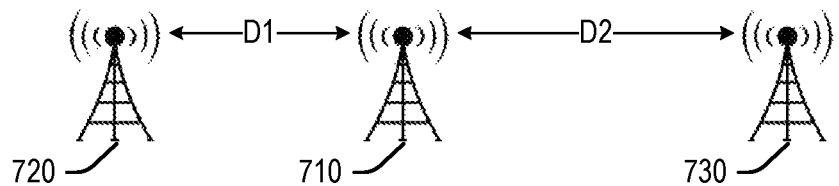
FIGS. 7A-7D depict exemplary associations of distances between access nodes with propagation delays and guard periods.
Figure 7B:
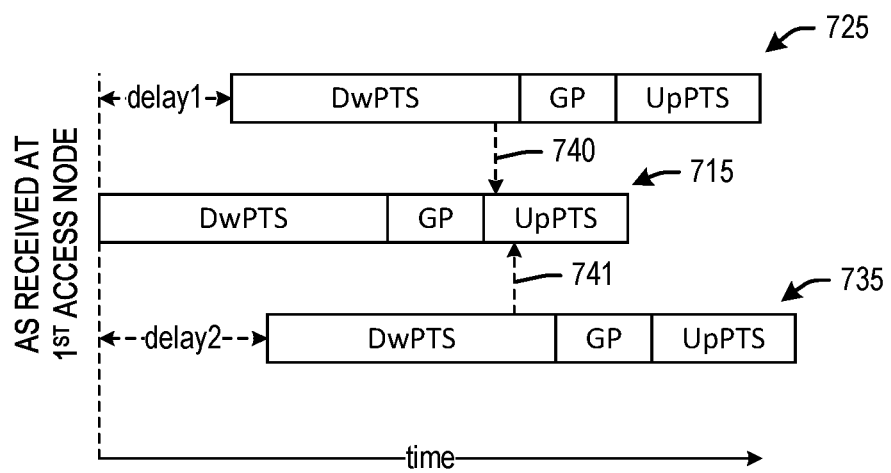

For example, FIG. 7B illustrates interference received at the first access node (i.e. access node 710). FIG. 7B illustrates special subframe 715 (utilized by access node 710), special subframe 725 (utilized by access node 720 at a distance D1 away from access node 710), and special subframe 735 (utilized by access node 730 at a distance D2 away from access node 710). As experienced by access node 710, special subframe 715 does not include a propagation delay (or, at least, includes a negligible propagation delay) since it is utilized for transmissions within a coverage area of access node 710. For example, special subframe 715 includes an uplink portion (UpPTS) that may contain uplink transmissions from wireless devices attached to access node 710. On the other hand, special subframe 725 utilized for communication sessions of access node 720 may be experienced at access node 710 with a propagation delay, illustrated herein as "delay1". For example, the propagation delay causes a downlink portion (DwPTS) of the special subframe 725 to coincide with the uplink portion of special subframe 715, thereby causing an interference 740. Further, special subframe 735 utilized for communication sessions of access node 730 may be experienced at access node 710 with a propagation delay, illustrated herein as "delay2". For example, the propagation delay causes a downlink portion (DwPTS) of the special subframe 735 to coincide with the uplink portion of special subframe 715, thereby causing an interference 741. Consequently, as described in the method of FIG. 6 (and in the exemplary special subframes of FIGS. 5A-5B), access node 710 is instructed to increase a guard period by selecting special subframe configurations with progressively longer guard periods, as provided in Table 2. Thus, at least downlink transmissions originating from access node 710 are less likely to interfere with uplink transmissions received at access nodes 720 and/or 730. This is because TDD systems ensure a certain amount of channel reciprocity (i.e. as downlink and uplink subframes from each access node utilize the same frequency), and based on the determination that downlink transmissions from access node 710 can also cause the same level of interference to uplink signals received at access nodes 720, 730, increasing the guard period of any of access nodes 710, 720, 730 can help to mitigate overall intercell interference.

Figure 7C:
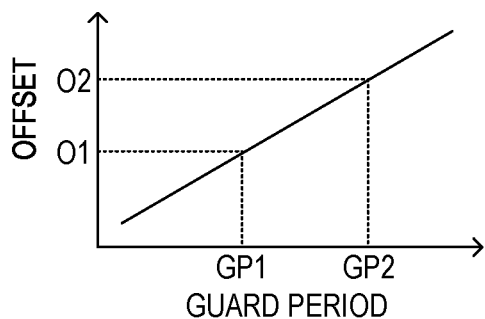
Figure 7D:
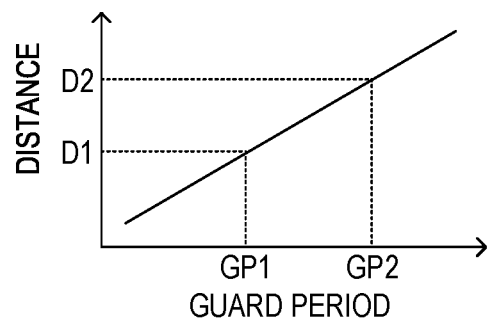

Further, as illustrated in FIGS. 7C and 7D, the propagation delay (i.e. "offset"), and a distance between access nodes can be associated with a selection of a guard period (or special subframe format). For example, FIG. 7C illustrates an association between an offset (equated with the aforementioned "delay") and a guard period selection, such that when an offset of O1 is measured or experienced at a first access node, a guard period GP1 is automatically selected (by, for example, selection of a special subframe configuration comprising GP1), and when an offset of O2 is measured or experienced at the first access node, a guard period GP2 is automatically selected (by, for example, selection of a special subframe configuration comprising GP2). Further, FIG. 7D shows a similar association between distance and guard period selection, such that when a distance D1 is obtained for a first interfering access node, a guard period GP1 is automatically selected (by, for example, selection of a special subframe configuration comprising GP1), and when a distance D2 is obtained for a second interfering access node, a guard period GP2 is automatically selected (by, for example, selection of a special subframe configuration comprising GP2). These associations may be stored in a database accessible to the first and second access nodes, a controller node, and/or any other network that may be configured to execute the disclosed method. Further, an identity of an interfering access node may be determined based on referring to the database, i.e. by correlating an "offset" or propagation delay with a distance, and the selection of a special subframe format (with a required guard period) from among a plurality of special subframe formats may be performed based on some combination of the distance and/or the identity of the interfering access node. Further, interference levels of a plurality of uplink signals received at a plurality of access nodes 710-730 may be monitored, and the guard period utilized by one or more of access nodes 710-730 adjusted in increments until the overall intercell interference is below a threshold. For example, the guard period for each access node can be increased by selecting special subframe configurations with progressively longer guard periods. It may further be determined that the guard period of special subframes utilized by the one of access nodes 710-730 cannot be increased while the interference is at or above the threshold. As a result, a guard period may be increased for special subframes utilized by other access nodes 710-730.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for mitigating interference between access nodes in a wireless network, the method comprising:
   determining a first interference caused within a first uplink portion of a first special subframe of a first access node by a first downlink signal transmitted from a second access node, wherein the first uplink portion comprises a signal transmitted from a wireless device in a coverage area of the first access node;
   determining, based on the first interference caused to the first uplink portion, that a second downlink signal transmitted from the first access node can cause a second interference to a second uplink portion of a second special subframe of the second access node;
   obtaining a distance between the first and second access nodes; and
   selecting a format of special subframes utilized by the first access node based on the distance, wherein special subframes of the selected format comprise a guard period between uplink pilot time slots and downlink pilot time slots of a duration sufficient to minimize the second interference,
   wherein adjusting the guard period comprises switching from a first special subframe format to a second special subframe format with a longer guard period.

2. The method of claim 1, wherein the first access node and the second access node are both configured to utilize subframes in a time-division-duplexing (TDD) format and using a same frame configuration.

3. The method of claim 2, wherein: the first interference is caused to the first uplink portion due to a first propagation delay of the first downlink signal, the second interference is caused to the second uplink portion due to a second propagation delay of the second downlink signal, and adjusting the guard period of the subsequent special subframes compensates for at least one of the first propagation delay and the second propagation delay.

4. The method of claim 3, wherein the at least one of the first propagation delay and the second propagation delay is associated with a distance between the first access node and the second access node, and the method further comprises storing, in a database, a plurality of distances between the first access node and a plurality of additional access nodes associated with a corresponding plurality of propagation delays.

5. The method of claim 4, further comprising determining an identity of the second access node based referring to the database.

6. The method of claim 1, further comprising monitoring interference levels of a plurality of uplink signals received at each of the first access node and the second access node, and increasing the guard period of special subframes utilized by both first and second access nodes in increments until the monitored interference levels are below a threshold.

7. The method of claim 6, further comprising determining that the guard period of special subframes utilized by the first access node cannot be increased while the interference is at or above the threshold; and increasing a guard period of special subframes utilized by the second access node.

8. The method of claim 1, wherein the second special subframe format comprises fewer downlink resources than the first special subframe format.

9. The method of claim 1, wherein determining the first interference or the second interference further comprises monitoring an uplink portion of resources within the first special subframe at one or both of the first access node and the second access node.

10. A system for mitigating interference between access nodes in a wireless network, the system comprising:
    a processing node; and
    a processor coupled to the processing node, the processor configured to perform operations comprising:
       monitoring uplink signals received within special subframes of a first access node for an interference, wherein the interference is caused by downlink signals transmitted from a second access node;
       determining that the interference increases to a threshold;
       obtaining a distance between the first and second access nodes; and
       selecting a format of special subframes utilized by the first access node based on the distance,
       wherein special subframes of the selected format comprise a guard period between uplink pilot time slots and downlink pilot time slots of a duration sufficient to minimize the second interference.

11. The system of claim 10, wherein the distance is associated with a propagation delay of the downlink signal from the second access node to the first access node, and wherein the interference is based on the propagation delay.

12. The system of claim 11, wherein the operations further comprise configuring the threshold based on a known distance between the first access node and the second access node.

13. The system of claim 10, wherein the operations further comprise determining that the interference increases to a second threshold, determining that the interference is additionally caused by downlink signals from a third access node, and switching the special subframes to a third format, the third format comprising a longer guard period than the first or second formats.

14. The system of claim 13, wherein the third format is selected based on a distance between the first access node and the third access node.

15. The system of claim 14, wherein the operations further comprise determining an identity of the third access node based on interference meeting the second threshold.

16. A processing node for mitigating interference between access nodes in a wireless network, the processing node being configured to perform operations comprising:
    determining a first interference caused within uplink portions of special subframes of a first access node by downlink signals transmitted from one or more additional access nodes;
    responsive to determining that the interference increases to a first threshold, obtaining a distance between the first access node and a second access node from the one or more additional access nodes; and
    selecting a format of special subframes utilized by the first access node based on the distance,
    wherein special subframes of the selected format comprise a guard period between uplink pilot time slots and downlink pilot time slots of a duration sufficient to minimize a second interference caused by downlink signals transmitted by the first access node to uplink portions of special subframes of the one or more additional access nodes.

17. The processing node of claim 16, wherein the operations further comprise:
   instructing the second access node to utilize special subframes comprising a guard period with an increased duration.

18. The processing node of claim 16, wherein the operations further comprise: determining that the interference increases to a second threshold; obtaining a second distance between the first access node and a third access node from the one or more additional access nodes; and selecting a format of special subframes utilized by the first access node based on the second distance.

* * * * *